Figure 1:
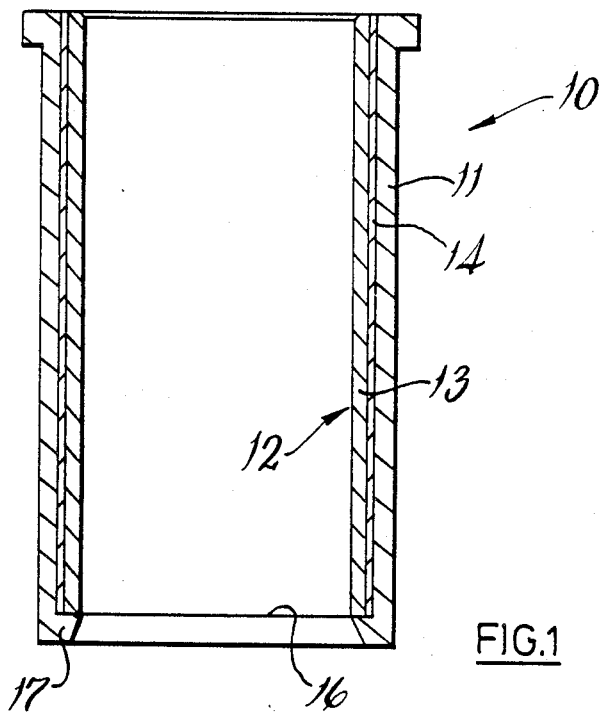

United States Patent [19]

Thorpe et al.

[11] Patent Number: 4,921,734
[45] Date of Patent: May 1, 1990

[54] CYLINDER LINERS

[75] Inventors: William A. Thorpe, Leicestershire; David C. Evans, Chesterfield, both of United Kingdom

[73] Assignee: AE PLC, Warwickshire, United Kingdom

[21] Appl. No.: 192,711

[22] Filed: May 11, 1988

[30] Foreign Application Priority Data

May 16, 1987 [GB] United Kingdom ............. 8711605

[51] Int. Cl.⁵ .......................... F02F 1/18; F16J 10/04; F02B 77/02
[52] U.S. Cl. .................... 428/34.4; 29/515; 123/668; 123/193 C; 427/34; 427/236; 428/34.9; 428/212; 428/469; 428/698; 428/701
[58] Field of Search .............. 428/34.4, 212, 218, 428/469, 470, 471, 472, 688, 618, 701, 623, 627, 632, 34.9, 668; 123/193 R, 143 C; 427/34, 236; 29/515, 428, 123

[56] References Cited

U.S. PATENT DOCUMENTS

| | | | |
|---|---|---|---|
| 4,419,971 | 12/1983 | Nakamura et al. | 428/34.4 |
| 4,523,554 | 6/1985 | Ryu | 123/193 C |
| 4,544,607 | 10/1985 | Kaneno et al. | 428/472 |
| 4,608,321 | 8/1986 | Sato et al. | 123/193 R |
| 4,648,243 | 3/1987 | Korkemeier | 138/111 |
| 4,774,926 | 10/1988 | Adams | 123/668 |

FOREIGN PATENT DOCUMENTS 0110488 6/1984 European Pat. Off. .
643435 9/1950 United Kingdom .

*Primary Examiner*—James Seidleck
*Attorney, Agent, or Firm*—William R. Hinds

[57] ABSTRACT

Cylinder liners for internal combustion engines, particularly diesel engines, are described the liners comprising a metal outer sleeve having therein an inner sleeve comprising a ceramic material which is held by compressive hoop stresses under all normal engine operating conditions, the inner sleeve extending over at least a part of the axial length of the liner. In a preferred embodiment the inner sleeve comprises a composite material of two different ceramic materials. For example an inner sleeve is described having a silicon nitride working surface with a layer of partially stabilized zirconia thereon.

9 Claims, 1 Drawing Sheet

CYLINDER LINERS

The present invention relates to cylinder liners for internal combustion engines and particularly to composite cylinder liners comprising metals and ceramic material for insulation purposes.

It is well known that the thermal efficiency of an internal combustion engine may be improved by reducing the quantity of heat rejected from the engine during running. One method of achieving such a reduction is to improve the heat insulating ability of the cylinder.

The use of ceramic cylinder liners has been proposed but ceramic materials suffer from being unreliable when subjected to tensile stresses.

It is not feasible to fit monolithic ceramic cylinder liners into existing engines having cast iron liners due to the strength limitations of most ceramics.

According to the present invention a cylinder liner for an internal combustion engine comprises a metal outer sleeve having therein a composite ceramic sleeve extending over at least a part of the length of the liner and which composite sleeve is held by compressive hoop stresses under all normal engine operating conditions wherein the composite ceramic sleeve comprises an inner sleeve of a first ceramic material having deposited on the outer diameter thereof, by plasma spraying, a layer of a second ceramic material having a lower coefficient of thermal conductivity than the first ceramic, the layer having a thickness additional to that of the inner sleeve.

The invention also provides a method of making such a cylinder liner.

The composite sleeve may comprise, for example, a sleeve of silicon nitride having on the outer diameter thereof a layer of zirconia.

The zirconia may, for example, be deposited by plasma spraying.

In such a construction the silicon nitride sleeve provides the running surface of the cylinder and has the necessary properties of good thermal shock-resistance and corrosion-resistance whilst the zirconia layer provides much enhanced thermal insulation due to the coefficient of thermal conductivity of the plasma sprayed material being approximately 10% that of silicon nitride.

Preferably the metal outer sleeve is made of steel.

The composite ceramic sleeve may be shrink-fitted into the metal sleeve by heating of the latter sleeve. The mechanical interference between the outer sleeve and the ceramic sleeve should be such that the ceramic sleeve is held under compressive stress for all engine operating conditions.

Figure 2:
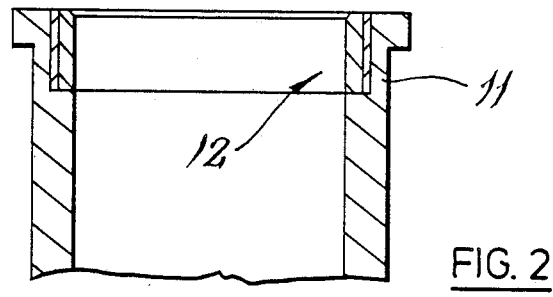

In order that the present invention may be more fully understood examples will no be described with reference to the accompanying drawings of which:

FIG. 1 shows a section, including the axis, through a cylinder liner according to the present invention; and FIG. 2 shows part of a second embodiment of a cylinder liner according to the present invention.

Referring now to FIG. 1 where the cylinder liner is shown generally at 10. The cylinder liner comprises a steel outer sleeve 11 having a composite ceramic sleeve 12 therein extending over the working length of the cylinder liner and which composite sleeve itself comprises two materials. The sleeve 12 comprises an inner cylinder sleeve 13 of reaction-bonded silicon nitride (RBSN) having a layer 14 of partially stabilised zirconia (PSZ) thereon. The layer 14 may be formed by plasma spraying, for example. The composite sleeve 12 is shrink-fitted to the steel sleeve 11. The sleeve 11 is first heated to 260° C. whereupon the inner sleeve 12 is inserted so that the lower edge 16 of the sleeve 12 abuts the step of the inwardly turned flange 17. The degree of hoop stress imposed by the steel sleeve 11 on the ceramic sleeve 12 is very high in the cold condition and may be close to the yield point of the steel and the compressive strength of the ceramic sleeve. This ensures that the ceramic is held in compression even when the steel has heated up during running of the engine.

A cylinder liner as described above having a bore of about 80 mm, an 817M40 to BS970 steel sleeve 11 of wall thickness about 6 mm, an RBSN wall thickness of 4 mm and a PSZ wall thickness of 2 mm was constructed for a single cylinder diesel test engine. The diesel engine used for the test normally has a cast iron cylinder liner. The engine was further equipped with a monolithic ceramic piston and a partially insulated cylinder. Running temperatures of the cylinder liner in the upper cylinder region were increased by 130° C., an increase of 60% over the conventional cylinder liner when using the same piston and cylinder head.

During one test of the engine the piston failed leaving the connecting rod to thrash about in the cylinder. No damage other than scoring of the cylinder liner was caused.

The cylinder liner on the running surface may be treated with, for example, a chromium oxide containing material as a porosity sealant to improve fuel consumption and to reduce friction between the rings and liner.

Although the invention has been described with reference to RBSN and PSZ other ceramics may of course be used and may, for example, include sintered silicon nitride, sialon or silicon carbide.

As is shown in FIG. 2 the composite cylinder sleeve 12 may extend only partially along the total cylinder length. The liner may be in the form of an internal cuff ending above the extent of travel of the topmost piston ring (not shown).

The steel used for the outer sleeve 11 will be dependent upon the relative thicknesses of the metal outer sleeve and the composite ceramic sleeve and the stress which it is desired to impart to the ceramic. Where the outer sleeve is relatively thick a mild steel may suffice.

We claim:

1. A cylinder liner for an internal combustion engine, the liner comprising a steel outer sleeve having therein a composite ceramic sleeve extending over at least a part of the length of the liner, said composite ceramic sleeve being held by compressive hoop stresses under all normal engine operating conditions, said hoop stresses being imposed by said steel outer sleeve. wherein said composite ceramic sleeve comprises an inner sleeve of a first ceramic material having deposited on the outer surface thereof, by plasma spraying, a layer of a second ceramic material, said layer having a thickness additional to that of said inner sleeve and said second ceramic material having a lower coefficient of thermal conductivity than said first ceramic.

2. A cylinder liner according to claim 1 wherein said composite ceramic sleeve extends along the full working length of the cylinder liner.

3. A cylinder liner according to claim 1 wherein the inner sleeve of the composite ceramic sleeve is silicon nitride.

4. A cylinder liner according to claim 1 wherein the layer of said second ceramic material is partially stabilized zirconia.

5. A cylinder according to claim 1 wherein the composite ceramic sleeve is shrink-fitted inside the steel outer sleeve.

6. A method of making a cylinder liner as claimed in claim 1 comprising forming a composite ceramic sleeve by depositing, by plasma spraying, on the outer surface of an inner sleeve of a first ceramic material a layer of a second ceramic material having a lower coefficient of thermal conductivity than said first ceramic material such that said layer overlies said inner sleeve and has a thickness additional to that of said inner sleeve so that the thickness of the composite ceramic sleeve is materially greater than the thickness of said inner sleeve, and shrink fitting said composite ceramic sleeve inside a steel outer sleeve such that said composite ceramic sleeve extends over at least part of the length of the liner and is held by compressive hoop stresses imposed by said steel outer sleeve under all normal engine operating conditions.

7. A cylinder liner for an internal combustion engine, the liner comprising a steel outer sleeve having shrink fitted therein a composite ceramic sleeve extending over at least a part of the length of the liner, said composite ceramic sleeve being held by compressive hoop stresses under all normal engine operating conditions, said hoop stresses being imposed by said steel outer sleeve, wherein said composite ceramic sleeve comprises an inner sleeve comprising silicon nitride material having deposited on the outer surface thereof, by plasma spraying, a layer comprising zirconia material, said layer having a thickness additional to that of said inner sleeve.

8. A cylinder liner according to claim 7 wherein said composite ceramic sleeve extends along the full working length of the cylinder liner.

9. A method of making a cylinder liner as claimed in claim 7 comprising forming a composite ceramic sleeve by depositing, by plasma spraying, on the outer surface of an inner sleeve of silicon nitride material a layer comprising zirconia material such that said layer overlies said inner sleeve and has a thickness additional to that of said inner sleeve so that the thickness of the composite ceramic sleeve is materially greater than the thickness of said inner sleeve, and shrink fitting said composite ceramic sleeve inside a steel outer sleeve such that said composite ceramic sleeve extends over at least part of the length of the liner and is held by compressive hoop stresses imposed by said steel outer sleeve under all normal engine operating conditions.

* * * * *